US008679294B2

(12) United States Patent
Hong et al.

(10) Patent No.: US 8,679,294 B2
(45) Date of Patent: Mar. 25, 2014

(54) EXPANDABLE MICROSPHERES AND METHODS OF MAKING AND USING THE SAME

(71) Applicant: International Paper Company, Memphis, TN (US)

(72) Inventors: Yaoliang Hong, Mason, OH (US); Kosaraju Krishna Mohan, Mason, OH (US); Victoria Laurentia Dimonie, Bethlehem, PA (US); Mark Edward Fagan, Loveland, OH (US); Andrew Klein, Somerville, NJ (US); Eric Scott Daniels, Bethlehem, PA (US); Brian Boyars, Las Vegas, NV (US); Peter M. Froass, Mason, OH (US); Christopher D. Anderson, Wescosville, PA (US); Edward David Sudol, Bethlehem, PA (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/761,620

(22) Filed: Feb. 7, 2013

(65) Prior Publication Data
US 2013/0146241 A1   Jun. 13, 2013

Related U.S. Application Data

(62) Division of application No. 12/549,960, filed on Aug. 28, 2009, now Pat. No. 8,382,945.

(60) Provisional application No. 61/190,354, filed on Aug. 28, 2008.

(51) Int. Cl.
 *B32B 5/20* (2006.01)

(52) U.S. Cl.
 USPC .................. 162/103; 162/158; 162/164.1

(58) Field of Classification Search
 USPC ............ 162/158, 164.1, 103; 521/56, 57; 524/27, 35; 428/402
 See application file for complete search history.

(56) References Cited

U.S. PATENT DOCUMENTS

| 1,117,113 | A | 11/1914 | Wagg |
|---|---|---|---|
| 1,892,873 | A | 1/1933 | Darrah |
| 1,500,207 | A | 7/1942 | Shaw |
| 2,800,458 | A | 7/1957 | Green |
| 3,200,033 | A | 8/1965 | Grossteinbeck at al. |
| 3,293,114 | A | 12/1966 | Kenaga et al. |
| 3,357,322 | A | 12/1967 | Gill |
| 3,359,130 | A | 12/1967 | Goldman |
| 3,468,467 | A | 9/1969 | Amberg |
| 3,515,569 | A | 6/1970 | Walters at al. |
| 3,533,908 | A | 10/1970 | Hoogsteen |
| 3,546,060 | A | 12/1970 | Hoppe et al. |
| 3,556,497 | A | 1/1971 | Grenfell |
| 3,556,934 | A | 1/1971 | Meyer |
| 3,611,583 | A | 10/1971 | Anderson et al. |
| 3,615,972 | A | 10/1971 | Morehouse et al. |
| 3,626,045 | A | 12/1971 | Woodings |
| 3,703,394 | A | 11/1972 | Hemming et al. |
| 3,740,359 | A | 6/1973 | Garner |
| 3,779,951 | A | 12/1973 | Streu |
| 3,785,254 | A | 1/1974 | Mann |
| 3,819,463 | A | 6/1974 | Ervin et al. |
| 3,819,470 | A | 6/1974 | Shaw et al. |
| 3,824,114 | A | 7/1974 | Vassillades et al. |
| 3,842,020 | A | 10/1974 | Garrett |
| 3,864,181 | A | 2/1975 | Wolinski et al. |
| 3,878,038 | A | 4/1975 | Opderbeck et al. |
| 3,914,360 | A | 10/1975 | Gunderman et al. |
| 3,936,890 | A | 2/1976 | Oberstein |
| 3,941,634 | A | 3/1976 | Nisser |
| 3,945,956 | A | 3/1976 | Garner |
| 3,998,618 | A | 12/1976 | Kreick et al. |
| 4,002,586 | A | 1/1977 | Wessling et al. |
| 4,006,273 | A | 2/1977 | Wolinski et al. |

(Continued)

FOREIGN PATENT DOCUMENTS

| CN | 1417390 | 5/2003 |
|---|---|---|
| CN | 101392473 | 3/2009 |

(Continued)

OTHER PUBLICATIONS

R. Wessling, Science and Technology of Polymer Colloids, NATO ASI Series E: Applied Sciences, No. 68, p. 393 (1983).

Maf Ahmad, Thermoplastic Microspheres as Foaming Agents for Wood Plastic Comp, Presented at WPC 2004 Conference, Vienna, Austria (http://www.expancel.com/english/bulletin/files/WPC2004PaperMA2.pdf).

Yasuhiro Kawaguchi et al.., Synthesis and properties of thermoplastic expandable microspheres: The relation between crosslinking density and expandable property, Journal of Applied Polymer Science, vol. 93, Issue 2, pp. 505-512.

(Continued)

*Primary Examiner* — Mark Halpern
(74) *Attorney, Agent, or Firm* — Thomas W. Barnes, III; Eric W. Guttag

(57) ABSTRACT

Expandable microspheres formed by suspension polymerization using a shot growth method are provided. The microspheres are formed of a continuous, gas impermeable shell surrounding a blowing agent. The shell includes a first polymer layer formed from primary monomers and a second layer that includes a chemically reactive monomer or a high Tg monomer. To form the microspheres, the primary monomers are polymerized in a reaction vessel to an approximate 90% polymerization, at which time a secondary monomer that is either a monomer having a Tg of at least 85° C. or a chemically reactive monomer, is added to the reaction vessel to drive the polymerization reaction to completion. The outer layer thus contains either a larger amount of the high Tg monomer or a chemically reactive monomer that possesses the ability to covalently bond a cationic species. The microspheres may be used in papermaking processes to increase the paper bulk.

6 Claims, No Drawings

(56) References Cited

U.S. PATENT DOCUMENTS

| | | |
|---|---|---|
| 4,022,965 A | 5/1977 | Goheen et al. |
| 4,040,900 A | 8/1977 | Mazzarella et al. |
| 4,044,176 A | 8/1977 | Wolinski et al. |
| 4,051,277 A | 9/1977 | Wilkinson et al. |
| 4,056,501 A | 11/1977 | Gibbs et al. |
| 4,075,136 A | 2/1978 | Schaper |
| 4,108,806 A | 8/1978 | Cohrs et al. |
| 4,133,688 A | 1/1979 | Sack |
| 4,166,894 A | 9/1979 | Schaper |
| 4,174,417 A | 11/1979 | Rydell |
| 4,179,546 A | 12/1979 | Garner et al. |
| 4,233,325 A | 11/1980 | Slangan et al. |
| 4,237,171 A | 12/1980 | Laage et al. |
| 4,241,125 A | 12/1980 | Canning et al. |
| 4,242,411 A | 12/1980 | Costa, Jr. et al. |
| 4,243,480 A | 1/1981 | Hernandez et al. |
| 4,268,615 A | 5/1981 | Yonezawa |
| 4,279,794 A | 7/1981 | Dumas |
| 4,323,602 A | 4/1982 | Parker |
| 4,324,753 A | 4/1982 | Gill |
| 4,344,787 A | 8/1982 | Beggs et al. |
| 4,385,961 A | 5/1983 | Svending et al. |
| 4,431,481 A | 2/1984 | Drach et al. |
| 4,435,344 A | 3/1984 | Iioka |
| 4,448,638 A | 5/1984 | Klowak |
| 4,451,585 A | 5/1984 | Andersson |
| 4,464,224 A | 8/1984 | Matolcsy |
| 4,477,518 A | 10/1984 | Cremona et al. |
| 4,482,429 A | 11/1984 | Klowak |
| 4,483,889 A | 11/1984 | Andersson |
| 4,496,427 A | 1/1985 | Davison |
| 4,548,349 A | 10/1985 | Tunberg |
| 4,581,285 A | 4/1986 | Mahefkey, Jr. |
| 4,617,223 A | 10/1986 | Hiscock et al. |
| 4,619,734 A | 10/1986 | Andersson |
| 4,722,943 A | 2/1988 | Milber et al. |
| 4,777,930 A | 10/1988 | Hartz |
| 4,781,243 A | 11/1988 | DeVogel et al. |
| 4,829,094 A | 5/1989 | Melber et al. |
| 4,836,400 A | 6/1989 | Chaffey et al. |
| 4,865,875 A | 9/1989 | Kellerman |
| 4,885,203 A | 12/1989 | Wakat |
| 4,898,752 A | 2/1990 | Cavagna et al. |
| 4,902,722 A | 2/1990 | Melber |
| 4,946,737 A | 8/1990 | Lindeman et al. |
| 4,952,628 A | 8/1990 | Blatz |
| 4,959,395 A | 9/1990 | Janda |
| 4,977,004 A | 12/1990 | Bettle, III et al. |
| 4,982,722 A | 1/1991 | Wyatt |
| 4,986,882 A | 1/1991 | Mackey et al. |
| 4,988,478 A | 1/1991 | Held |
| 5,000,788 A | 3/1991 | Stotler |
| 5,029,749 A | 7/1991 | Aloisi |
| 5,049,235 A | 9/1991 | Barcus et al. |
| 5,092,485 A | 3/1992 | Lee |
| 5,096,650 A | 3/1992 | Renna |
| 5,101,600 A | 4/1992 | Morris et al. |
| 5,102,948 A | 4/1992 | Deguchi et al. |
| 5,125,996 A | 6/1992 | Campbell et al. |
| 5,126,192 A | 6/1992 | Chellis et al. |
| 5,132,061 A | 7/1992 | Lindeman et al. |
| 5,139,538 A | 8/1992 | Morris et al. |
| 5,145,107 A | 9/1992 | Silver et al. |
| 5,155,138 A | 10/1992 | Lundqvist |
| 5,160,789 A | 11/1992 | Barcus et al. |
| 5,209,953 A | 5/1993 | Grupe et al. |
| 5,219,875 A | 6/1993 | Sherba et al. |
| 5,225,123 A | 7/1993 | Torobin |
| 5,226,585 A | 7/1993 | Varano |
| 5,242,545 A | 9/1993 | Bradway et al. |
| 5,244,541 A | 9/1993 | Minton |
| 5,266,250 A | 11/1993 | Kroyer |
| 5,271,766 A | 12/1993 | Koutlakis et al. |
| 5,296,024 A | 3/1994 | Hutcheson |
| 5,342,649 A | 8/1994 | Sarokin |
| 5,360,420 A | 11/1994 | Cook et al. |
| 5,360,825 A | 11/1994 | Noguchi et al. |
| 5,363,982 A | 11/1994 | Sadlier |
| 5,370,814 A | 12/1994 | Salyer |
| 5,397,759 A | 3/1995 | Torobin |
| 5,417,753 A | 5/1995 | Hutcheson |
| 5,424,519 A | 6/1995 | Salee |
| 5,443,899 A | 8/1995 | Barcus et al. |
| 5,454,471 A | 10/1995 | Norvell |
| 5,464,622 A | 11/1995 | Mehta et al. |
| 5,477,917 A | 12/1995 | Salyer |
| 5,478,988 A | 12/1995 | Hughes et al. |
| 5,484,815 A | 1/1996 | Petersen et al. |
| 5,490,631 A | 2/1996 | Iioka et al. |
| 5,499,460 A | 3/1996 | Bryant et al. |
| 5,514,429 A | 5/1996 | Kamihgaraguchi et al. |
| 5,520,103 A | 5/1996 | Zielinski et al. |
| 5,531,728 A | 7/1996 | Lash |
| 5,536,756 A | 7/1996 | Kida et al. |
| 5,585,119 A | 12/1996 | Petersen et al. |
| 5,593,680 A | 1/1997 | Bara et al. |
| 5,601,744 A | 2/1997 | Baldwin |
| 5,629,364 A | 5/1997 | Malmbom et al. |
| 5,637,389 A | 6/1997 | Colvin et al. |
| 5,649,478 A | 7/1997 | Chadha |
| 5,662,761 A | 9/1997 | Middelman et al. |
| 5,662,773 A | 9/1997 | Frederick et al. |
| 5,667,637 A | 9/1997 | Jewell et al. |
| 5,674,509 A | 10/1997 | Anderson et al. |
| 5,685,068 A | 11/1997 | Bankestrom et al. |
| 5,698,074 A | 12/1997 | Barcus et al. |
| 5,698,688 A | 12/1997 | Smith et al. |
| 5,700,560 A | 12/1997 | Kotani et al. |
| H1704 H | 1/1998 | Wallajapet et al. |
| 5,705,242 A | 1/1998 | Andersen et al. |
| 5,731,080 A | 3/1998 | Cousin et al. |
| 5,759,624 A | 6/1998 | Neale et al. |
| 5,785,817 A | 7/1998 | Tan et al. |
| 5,792,398 A | 8/1998 | Andersson |
| 5,800,676 A | 9/1998 | Koike et al. |
| 5,856,389 A | 1/1999 | Kostrzewski et al. |
| 5,861,214 A | 1/1999 | Kitano et al. |
| 5,880,435 A | 3/1999 | Bostic |
| 5,884,006 A | 3/1999 | Frohlich et al. |
| 5,938,825 A | 8/1999 | Gaglani et al. |
| 5,952,068 A | 9/1999 | Neale et al. |
| 5,965,109 A | 10/1999 | Lohrmann |
| 6,007,320 A | 12/1999 | Froese et al. |
| 6,034,081 A | 3/2000 | Whittemore et al. |
| 6,042,936 A | 3/2000 | Kempf |
| 6,133,170 A | 10/2000 | Suenaga et al. |
| 6,134,952 A | 10/2000 | Garver et al. |
| 6,146,494 A | 11/2000 | Seger et al. |
| 6,225,361 B1 | 5/2001 | Nakajima |
| 6,228,200 B1 | 5/2001 | Willis et al. |
| 6,235,394 B1 | 5/2001 | Shimazawa et al. |
| 6,248,799 B1 | 6/2001 | Peretti et al. |
| 6,254,725 B1 | 7/2001 | Lau et al. |
| 6,267,837 B1 | 7/2001 | Mitchell et al. |
| 6,308,883 B1 | 10/2001 | Schmelzer et al. |
| 6,352,183 B1 | 3/2002 | Kristiansen et al. |
| 6,361,651 B1 | 3/2002 | Sun |
| 6,379,497 B1 | 4/2002 | Sandstrom et al. |
| 6,387,492 B2 | 5/2002 | Soane et al. |
| 6,391,154 B1 | 5/2002 | Nygård et al. |
| 6,391,943 B2 | 5/2002 | Sarma et al. |
| 6,406,592 B2 | 6/2002 | Leskela et al. |
| 6,454,989 B1 | 9/2002 | Neely et al. |
| 6,455,156 B1 | 9/2002 | Tanaka et al. |
| 6,471,824 B1 | 10/2002 | Jewell |
| 6,497,790 B2 | 12/2002 | Mohan et al. |
| 6,506,282 B2 | 1/2003 | Hu et al. |
| 6,509,384 B2 | 1/2003 | Kron et al. |
| 6,531,183 B1 | 3/2003 | Cason et al. |
| 6,537,680 B1 | 3/2003 | Norlander et al. |
| 6,579,414 B2 | 6/2003 | Jewell |
| 6,579,415 B2 | 6/2003 | Jewell |
| 6,582,557 B2 | 6/2003 | Jewell |
| 6,582,633 B2 | 6/2003 | Elfving et al. |

(56) References Cited

U.S. PATENT DOCUMENTS

| | | |
|---|---|---|
| 6,592,712 B2 | 7/2003 | Koukoulas et al. |
| 6,592,717 B2 | 7/2003 | Jewell |
| 6,592,983 B1 | 7/2003 | Carson et al. |
| 6,613,810 B1 | 9/2003 | Ejiri et al. |
| 6,617,364 B2 | 9/2003 | Soane et al. |
| 6,630,232 B1 | 10/2003 | Muser et al. |
| 6,701,637 B2 | 3/2004 | Lindsay et al. |
| 6,740,373 B1 | 5/2004 | Swoboda et al. |
| 6,802,938 B2 | 10/2004 | Mohan et al. |
| 6,846,529 B2 | 1/2005 | Mohan et al. |
| 6,864,297 B2 | 3/2005 | Nutt et al. |
| 6,866,906 B2 | 3/2005 | Williams et al. |
| 6,890,636 B2 | 5/2005 | Danver |
| 6,893,473 B2 | 5/2005 | Neogi et al. |
| 6,919,111 B2 | 7/2005 | Swoboda et al. |
| 6,984,347 B2 | 1/2006 | Masuda et al. |
| 7,018,509 B2 | 3/2006 | Kilgannon et al. |
| 7,033,527 B2 | 4/2006 | Kim et al. |
| 7,070,679 B2 | 7/2006 | Cason et al. |
| 7,192,989 B2 | 3/2007 | Svedberg et al. |
| 7,202,284 B1 | 4/2007 | Limerkens et al. |
| 7,230,036 B2 | 6/2007 | Glorioso, Jr. et al. |
| 7,232,607 B2 | 6/2007 | Satake et al. |
| 7,252,882 B2 | 8/2007 | Satake et al. |
| 7,253,217 B2 | 8/2007 | Sohal |
| 7,291,239 B2 | 11/2007 | Polanco et al. |
| 7,335,279 B2 | 2/2008 | Mohan et al. |
| 7,361,399 B2 | 4/2008 | Song et al. |
| 7,482,046 B2 | 1/2009 | Williams et al. |
| 7,682,486 B2 | 3/2010 | Mohan et al. |
| 7,740,740 B2 | 6/2010 | Mohan et al. |
| 7,790,251 B2 | 9/2010 | Williams et al. |
| 7,943,011 B2 | 5/2011 | Reed et al. |
| 8,030,365 B2 | 10/2011 | Mohan et al. |
| 8,034,847 B2 | 10/2011 | Mohan et al. |
| 2001/0024716 A1 | 9/2001 | Chen et al. |
| 2001/0038893 A1 | 11/2001 | Mohan et al. |
| 2001/0044477 A1 | 11/2001 | Soane et al. |
| 2001/0046574 A1 | 11/2001 | Curtis |
| 2002/0074100 A1 | 6/2002 | Yeh et al. |
| 2002/0096277 A1 | 7/2002 | Lau et al. |
| 2002/0104632 A1 | 8/2002 | Jimenez et al. |
| 2002/0148832 A1 | 10/2002 | Breining et al. |
| 2002/0152630 A1 | 10/2002 | Lindsay et al. |
| 2003/0003268 A1 | 1/2003 | Williams et al. |
| 2003/0008931 A1 | 1/2003 | Soane et al. |
| 2003/0008932 A1 | 1/2003 | Soane et al. |
| 2003/0065041 A1 | 4/2003 | Kelser et al. |
| 2003/0152724 A1 | 8/2003 | Swoboda et al. |
| 2003/0175497 A1 | 9/2003 | Kobe et al. |
| 2003/0213544 A1 | 11/2003 | Hesch |
| 2004/0030080 A1 | 2/2004 | Chang et al. |
| 2004/0052989 A1 | 3/2004 | Mohan et al. |
| 2004/0065423 A1 | 4/2004 | Swerin et al. |
| 2004/0065424 A1 | 4/2004 | Mohan et al. |
| 2004/0099391 A1 | 5/2004 | Ching et al. |
| 2004/0123966 A1 | 7/2004 | Altman et al. |
| 2004/0157057 A1 | 8/2004 | Tasaki et al. |
| 2004/0170836 A1 | 9/2004 | Bond et al. |
| 2004/0181053 A1 | 9/2004 | Bruun et al. |
| 2004/0197500 A9 | 10/2004 | Swoboda et al. |
| 2004/0209023 A1 | 10/2004 | Swoboda et al. |
| 2004/0221976 A1 | 11/2004 | Williams et al. |
| 2004/0238138 A1 | 12/2004 | Ishizaki et al. |
| 2004/0249005 A1 | 12/2004 | Kron et al. |
| 2005/0031851 A1 | 2/2005 | Depres |
| 2005/0079352 A1 | 4/2005 | Glorioso et al. |
| 2005/0098286 A1 | 5/2005 | Williams et al. |
| 2005/0112305 A1 | 5/2005 | Swoboda et al. |
| 2005/0133183 A1 | 6/2005 | Mohan et al. |
| 2005/0221073 A1 | 10/2005 | Liou |
| 2006/0000569 A1 | 1/2006 | Kron et al. |
| 2006/0057356 A1 | 3/2006 | Yamamura et al. |
| 2006/0057365 A1 | 3/2006 | Swoboda et al. |
| 2006/0060317 A1 | 3/2006 | Roding et al. |
| 2006/0063000 A1 | 3/2006 | Tokumura et al. |
| 2006/0099247 A1 | 5/2006 | Cantwell et al. |
| 2006/0102307 A1 | 5/2006 | Kron et al. |
| 2006/0131362 A1 | 6/2006 | Bergenudd et al. |
| 2006/0173087 A1 | 8/2006 | Hyde et al. |
| 2006/0185808 A1 | 8/2006 | Nguyen |
| 2006/0207735 A1 | 9/2006 | Blanz et al. |
| 2006/0231227 A1 | 10/2006 | Williams et al. |
| 2006/0235095 A1 | 10/2006 | Leberfinger et al. |
| 2006/0235096 A1 | 10/2006 | Luisi |
| 2007/0043130 A1 | 2/2007 | Svedberg et al. |
| 2007/0044929 A1* | 3/2007 | Mohan et al. ................. 162/158 |
| 2007/0142485 A1 | 6/2007 | Nordin et al. |
| 2007/0154711 A1 | 7/2007 | Masuda et al. |
| 2007/0208093 A1 | 9/2007 | Nordin et al. |
| 2007/0256805 A1 | 11/2007 | Reed et al. |
| 2007/0287776 A1 | 12/2007 | Nordin et al. |
| 2008/0017338 A1* | 1/2008 | Nordin et al. ................. 162/103 |
| 2008/0163992 A1 | 7/2008 | Mohan et al. |
| 2008/0171186 A1 | 7/2008 | Mohan et al. |
| 2008/0314539 A1 | 12/2008 | Williams et al. |
| 2009/0020247 A1 | 1/2009 | Swerin et al. |
| 2009/0246459 A1 | 10/2009 | Williams et al. |
| 2009/0280328 A1 | 11/2009 | Masuda et al. |
| 2010/0032114 A1 | 2/2010 | Mohan et al. |
| 2010/0032115 A1 | 2/2010 | Mohan et al. |
| 2010/0051220 A1 | 3/2010 | Hong et al. |
| 2010/0252216 A1 | 10/2010 | Mohan et al. |
| 2011/0036526 A1 | 2/2011 | Williams et al. |
| 2011/0277949 A1 | 11/2011 | Mohan et al. |
| 2013/0040121 A1 | 2/2013 | Singh |
| 2013/0146240 A1 | 6/2013 | Mohan et al. |

FOREIGN PATENT DOCUMENTS

| | | |
|---|---|---|
| EP | 0031161 A1 | 12/1980 |
| EP | 102335 | 3/1984 |
| EP | 0056219 | 3/1985 |
| EP | 0049672 | 4/1985 |
| EP | 0041054 | 10/1985 |
| EP | 112807 | 11/1987 |
| EP | 320473 | 6/1989 |
| EP | 0190788 | 4/1990 |
| EP | 0432355 | 6/1991 |
| EP | 0629741 | 6/1994 |
| EP | 0596750 | 9/1994 |
| EP | 0666388 | 2/1995 |
| EP | 0700237 | 3/1996 |
| EP | 0651696 | 8/1998 |
| EP | 0751866 | 4/1999 |
| EP | 1050622 | 11/2000 |
| EP | 1101809 | 5/2001 |
| EP | 0484893 | 6/2001 |
| EP | 1531196 | 5/2005 |
| EP | 1275688 | 12/2005 |
| EP | 1712585 | 10/2006 |
| EP | 1852552 | 11/2007 |
| GB | 0786543 | 11/1957 |
| GB | 0903416 | 8/1962 |
| GB | 1311556 | 3/1973 |
| GB | 1373788 | 11/1974 |
| GB | 1401675 | 7/1975 |
| GB | 1412857 | 11/1975 |
| GB | 1533434 | 11/1978 |
| JP | 55023126 | 2/1980 |
| JP | 56030439 | 3/1981 |
| JP | 59227933 | 12/1984 |
| JP | 2056240 | 2/1990 |
| JP | 4059674 | 2/1992 |
| JP | 06157215 | 6/1994 |
| JP | 06329834 | 11/1994 |
| JP | 10219596 | 8/1998 |
| JP | 11209504 | 8/1999 |
| JP | 2000273235 | 10/2000 |
| JP | 2005001357 | 1/2005 |
| JP | 2005179685 | 7/2005 |
| JP | 2006063509 | 3/2006 |
| WO | 8806916 | 9/1988 |
| WO | 9526441 | 10/1995 |

(56) References Cited

FOREIGN PATENT DOCUMENTS

| WO | 9914267 | 3/1999 |
|----|---------|--------|
| WO | 9944813 | 9/1999 |
| WO | 0179600 | 10/2001 |
| WO | 02086234 | 10/2002 |

OTHER PUBLICATIONS

Samel et al., Expandable microspheres incorporated in a PDMS matrix: a novel thermal composite actuator for liquid handling in microfluidic applications, Transducers, Solid-State Sensors, Actuators and Microsystems, 12th International Conference, vol. 2, issue 6-12, Jun. 2003, pp. 1558-1561.
Moulton, Glen E. "Chemical Reactions: Ionic, Covalent, and Polar Covalent Bonds." The Complete Idiot's Guide to Biology 2004. Penguin Group.
Smook, Gary A., Handbook for Pulp and Paper Technologists, 2nd ed, Angus Wilde Publications, 1992, pp. 220, 285 and 292-295.
Tappl/May 1972, vol. 55, No. 5, p. 770-771.
Tappi/Dec. 1973, vol. 56, No. 12, p. 158-160.
"The Use of Microspheres to Improve Paper Properties", by Soderberg, Paper Technology, Aug. 1989, pp. VII/17-VII/21.
"The Application of Microspheres for the Production of High Bulk Papers", by M. Baumeister, Das Papier, vol. 26, No. 10A: 716-720 (1972).
"Microspheres find use as fiber replacement in low-density board", by David O. Bowen, Pulp Paper Nov. 1976, p. 126-127.
"Foams on the Cutting Edge", by Ray Erikson, Jan. 1999.
"Xpancel.RTM.", An introduction, a publication from Expancel, Box 13000, S0-850 13 Sundsvall, Sweden.
Expancel .RTM. Expandable Microspheres in Paper and Board, by Mark Lunabba, KemaNord Plast AB, Sector Microspheres, Box 13000, S-850 13 Sundsvall, Sweden.
"Expandable Microspheres in Board", World Pulp Paper Technology, pp. 143-145.
E. Strazdins in the Sizing of Paper, Second Edition, cited by W. F. Reynolds, TAPPI Press, 1989, pp. 1-31.
Slndall, R. W., "Paper Technology. An Elementary Manual on the Manufacture, Physical Qualities and Chemical Constituents of Paper and Paper-Making Fibres," 1906, Charles Griffin and Company, limited, pp. 1-5.
C.E. Farley and R.B. Wasser in the Sizing of Paper, Second Edition, edited by W. F. Reynolds, TAPPI Press, 1989, pp. 51.62.
Hollow Microsperes, Chemical Engineering Technology, vol. 27, issue 8, pp. 829-837, Published Online: Aug. 2, 2004.
Akzo Nobel Expancel 551 DE 20 Dry Expanded Microspheres, Material Data Sheet from MatWeb.com.
J. Peel, Paper Science and Paper Manufacture 1999, pp. 18-19.
Density of starch granules—Potato Solanum tuberosum—BNID 103206, Bionumbers—the database of useful biological numbers, Milo et al. Nucl. Acids Res. 2010, 38 suppl : D750-D753,[online, Retrieved from the Internet, retrieved on Jul. 21, 2013 URL: http:bionumbers.hms.harvard.edu-bionumber.aspx-s=y-id=103206-ver=7.
Starch Slurry Density, International Starch Institute, online, 1999-2012, Retrieved from the Internet, retrieved on Jul. 21, 2013URL http:www.starch.dk isi/tables density.asp.
Polymer Handbook (4th Edition), Edited by Brandrup, Immergut, Grulke, Abe, Bloch, Solid State Properties Glass Transition Temperatures of Polymers, 2005, John Wiley Sons ISBN: 978-0-471-16628-3, p. VI-203, 204, 215, 216.

\* cited by examiner

US 8,679,294 B2

EXPANDABLE MICROSPHERES AND METHODS OF MAKING AND USING THE SAME

CROSS REFERENCE TO RELATED APPLICATIONS

This application is a DIV of application Ser. No. 12/549,960, Aug. 28, 2009 U.S. Pat. No. 8,382,945 which claims priority benefit of U.S. Provisional Patent Application Ser. No. 61/190,354 entitled "Expandable Microspheres And Methods Of Making And Using The Same" filed Aug. 28, 2008, the entire content of which is expressly incorporated herein by reference in its entirety

TECHNICAL FIELD AND INDUSTRIAL APPLICABILITY OF THE INVENTION

The present invention relates generally to expandable microspheres for use in papermaking processes, and more particularly, to thermally expandable microspheres formed by suspension polymerization utilizing a shot growth technique. A composition and paper substrate including the expandable microspheres are also provided.

BACKGROUND OF THE INVENTION

The amount of costly cellulose fibers present in a paper substrate, in part, determines the density of the substrate. Therefore, large amounts of these costly cellulose fibers present in a paper substrate produce a more dense substrate at high cost, while low amounts of cellulose fibers present in a paper substrate produce a less dense substrate at a low cost. Reducing the density of a coated and/or uncoated paper product, board, and/or substrate inevitably leads to reduced production costs. This correlation remains true for all paper and substrate production and uses thereof, but is especially true, for example, in paper substrates used in envelopes, folding cartons, and in other packing applications. The substrates used in such envelope and packaging applications have a specified thickness or caliper.

By reducing the density of the paper substrate at a target caliper, less cellulose fibers are required to achieve the target caliper. In addition to a reduction in production costs, there is a production efficiency that is appreciated and realized when a paper substrate's density is reduced. This production efficiency is due, at least in part, to a reduction in drying requirements (e.g., time, labor, capital, etc.) of the paper substrate during production.

Examples of reducing density of the base paper substrate include the use of:

Multi-ply machines with bulky fibers, such as BCTMP and other mechanical fibers in the center plies of paperboard;
Extended nip press section for reducing densification during water removal; and
Alternative calendering technologies such as hot soft calendering, hot steel calendering, steam moisturization, shoe nip calendering, etc.

However, these potential solutions involve high capital and costs. Thus, they may be economically infeasible.

Further, even if the above-mentioned costly reduction in density methods are realized, thus producing a paper substrate having a target caliper, the substrate is only useful if such methodologies foster an acceptably smooth and compressible surface of the paper substrate. Presently, there are few potential low cost solutions to reduce the density of a paper substrate that has an acceptable smoothness and compressibility so that the substrate has a significant reduction in print mottle and an acceptable smoothness.

Low density coated and uncoated paper products, board, and/or substrates are highly desirable from an aesthetic and economic perspective. Unfortunately, current methodologies produce substrates that have poor print and/or printability quality. In addition, acceptable smoothness targets are difficult to attain using conventional methodologies.

One methodology to address the above-mentioned problems at lower cost is the utilization of expandable microspheres in paper substrates. These methodologies, in part, can be found in the following U.S. Pat. Nos. 6,846,529; 6,802,938; 5,856,389; and 5,342,649 and in the following U.S. Patent Publications: 2008/0017338; 2007/0044929; 2007/0208093; 2006/0000569; 2006/0102307; 2004/0065424; 2004/0052989; 2004/0249005 and 2001/0038893. The contents of each of these patents and publications are hereby expressly incorporated by reference in their entirety.

Many microspheres are found, when applied to the papermaking process, to have relatively low retention in the resultant paper substrate. As a result, the expandable microspheres are lost to the white water in the paper making process and the efficiency of the introduction of the expandable microspheres into the resultant paper substrate is low. U.S. Patent Publication Serial No. 2007/0044929 attempts to increase the retention of the microspheres by creating a composition having a much less negative charge than the base expandable microsphere compositions known previously.

Despite attempts to create a less dense and more bulky paper substrate, there remains a need in the art for a less costly and more efficient solution to reduce density and increase bulk while maintaining good performance characteristics such as smoothness and print mottle in the paper substrate.

SUMMARY OF THE INVENTION

It is an object of the present invention to provide an expandable microsphere that includes a gas impermeable shell encapsulating at least one blowing agent. The shell is formed of a first polymeric layer that surrounds the blowing agent and a second polymeric layer that at least substantially encapsulates the first polymeric layer. The first polymeric layer may be formed of polymers formed from nitrile containing monomers, acrylic ester monomers, methacrylic ester monomers, vinyl esters and/or vinyl halide monomers. The second polymeric layer includes at least one monomer that is either a monomer having a Tg of at least 85° C. or a chemically reactive monomer. In one exemplary embodiment, the chemically reactive monomer provides functional groups to the second layer to permit the covalent bonding of a cationic species thereto. In another embodiment, the incorporation of high Tg monomers in the second layer creates an outer layer that has a greater concentration of the high Tg monomers compared to the first polymeric layer. The expandable microsphere may have a zeta potential that is greater than or equal to zero mV at a pH of about 9.0 or less at an ionic strength from 10-6 M to 0.1 M. In addition, the microspheres may have a small expanded volume average diameter, preferably less than about 20 μm.

It is another object of the present invention to provide a method of forming an expandable microsphere such as is described in the preceding paragraph. The method includes (1) mixing primary monomers selected from nitrile containing monomers, acrylic ester monomers, methacrylic ester monomers, vinyl esters, vinyl halide monomers and combinations thereof, at least one blowing agent, a crosslinking monomer, a polymerization initiator, and a stabilizer in a reaction vessel for a period of time sufficient to achieve an approximate 90% polymerization of the primary monomers and form a first polymeric layer surrounding the blowing agent and (2) adding a secondary monomer selected from monomers having a Tg of at least 85° C. and chemically reactive monomers to the reaction vessel to form a second polymeric layer that at least substantially surrounds the first polymeric layer and forms the expandable microsphere. The addition or "shot" of the high Tg monomers positions the high Tg monomers in the second polymeric layer in a concentration that exceeds the concentration of that particular Tg monomer in the first polymeric layer. In another embodiment, the chemically reactive monomer is added as the "shot" of monomer to provide functional groups on the outer surface of the second layer and permit the covalent attachment of cationic species. In at least one exemplary embodiment, a salt, a phase partitioner, an inhibitor, an acid, and/or water may be added to the reaction vessel. In addition, the reaction vessel may be purged with an inert gas to remove unwanted oxygen in the headspace.

It is a further object of the present invention to provide a paper that includes cellulose fibers and the expandable microspheres described above. The paper may have a Sheffield Smoothness of less than 250 SU as measured by TAPPI test method T 538 om-1 and/or a scanning 2nd cyan print mottle of not more than 6. In one embodiment, the paper may be calendared.

It is also an object of the present invention to provide a composition that includes the expandable microsphere described above and a plurality of cellulose fibers.

It is an advantage of the present invention that a microsphere having an inner layer and an outer, functionalized layer may be formed by suspension polymerization using a shot growth technique.

It is another advantage of the present invention that cations may be covalently and/or non-covalently bound to functional groups located on the second (outer) layer of the microsphere to modify the surface charge of the microsphere and create a modified microsphere.

It is yet another advantage of the present invention that a microsphere having an inner layer and an outer layer including a monomer with a Tg of at least 85° C. may be formed by suspension polymerization using a shot growth technique.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references.

It is to be appreciated that "thermally expandable microsphere", "expandable microsphere", and "microsphere" may be used interchangeably herein. Additionally, the terms "first layer" and "second layer" may be interchangeably used with "inner layer" and "outer layer", respectively. The terms "polymer layer" and "polymeric layer" may also be interchanged.

The present invention is directed to thermally expandable microspheres formed by suspension polymerization using a shot growth technique. The shot growth method permits the formation of a second, outer layer that includes a chemically reactive monomer or an outer layer containing a high Tg monomer. The microspheres desirably have a cationic charge at the outer surface to improve retention of the microspheres in the papermaking process. In one or more exemplary embodiments, the microspheres may have bound thereto a cationic species. The microspheres described herein may be used in conventional papermaking processes to increase bulk and to reduce the amount of cellulosic fiber used, thereby reducing manufacturing costs associated with the papermaking process.

The thermally expandable microspheres are formed of a continuous thermoplastic polymeric, gas impermeable shell housing therein at least one blowing agent. In exemplary embodiments, the polymer shell of the expandable microsphere has a first (inner) polymeric layer and a second (outer) polymeric layer. The second layer at least substantially surrounds or encapsulates the first layer. It is to be appreciated that the phrase "at least substantially surrounds" is meant to denote that the second layer surrounds or nearly surrounds the first layer.

As used herein, the term "layer" may be a separate, distinct, or a physically separate portion of the microsphere. Also, a "layer" may not be a separate, distinct, or a physically separate portion of the microsphere. In one embodiment, two "layers" may have portions thereof that interpenetrate and/or overlap with one another. In another embodiment, a "layer" may be the result of at least one of at least two polymerization stages to create a continuous, polymeric shell from the monomers. In a further embodiment when at least two "layers" exist, there may be no clear demarcation of where the first "layer" ends and the second "layer" begins, but rather a transition from one "layer" to the other as a result of at least one first polymerization stage using a set of primary monomers at initial starting concentrations that are consumed in part or in whole and at least one second polymerization stage using a set of secondary monomer(s) at a second concentration(s), provided that the secondary monomer(s) is different than the primary monomers or the second concentrations are different than the initial starting concentrations.

The inner polymer layer may be formed of homo- and/or co-polymers obtained by polymerizing ethylenically unsaturated monomers. In exemplary embodiments, the inner polymer layer is formed from the polymerization and/or copolymerization of nitrile containing monomers, acrylic ester monomers, methacrylic ester monomers, vinyl esters, vinyl halide monomers, and combinations thereof. Suitable examples of nitrile containing monomers include acrylonitrile, methacrylonitrile, α-chloroacrylonitrile, α-ethoxyacrylonitrile, fumaronitrile, and crotonitrile. Non-limiting examples of acrylic ester monomers include methyl acrylate and ethyl acrylate. Examples of methacrylic ester monomers include, but are not limited to, methyl methacrylate, isobornyl methacrylate, glycidyl methacrylate, tert-butylaminoethyl methacrylate, and ethyl methacrylate. Suitable examples of vinyl or vinylidene halide monomers include vinyl chloride and vinylidene chloride. Non-limiting examples of vinyl ester monomers include vinyl acetate and vinyl pyridine.

In a preferred embodiment, the inner polymer layer is formed from the polymerization and/or copolymerization of a nitrile containing monomer (e.g., acrylonitrile (AN)), an acrylic ester and/or methacrylic ester monomer (e.g., methyl methacrylate (MMA)), and a vinyl and/or vinylidenehalide monomer (e.g., vinylidene chloride (VDC)).

The vinyl and/or vinylidenehalide monomers may be present in the first layer in an amount of at least 50 weight % based on the total weight of the monomers. In exemplary embodiments, the vinyl and/or vinylidenehalide monomers may be present in an amount from about 55 to about 95 weight %, from about 60 to about 90 weight %, and preferably from greater than 65 to less than 85 weight %. As used herein, with respect to the monomers, the phrase "weight %" is meant to denote "weight % based on the total weight of the monomers". In addition, it is to be understood that all ranges recited herein are intended to include all sub-ranges within the broad range.

The acrylic ester and/or methacrylic ester monomers may be present in the first layer in an amount of at least 0.1 weight %. In exemplary embodiments, the acrylic ester and/or methacrylic ester is present in the first layer in an amount from about 0.5 to about 10 weight %, from about 1 to about 8 weight %, and preferably in an amount from about 1.5 to about 5 weight %.

The nitrile containing monomers may be present in the first layer in an amount of at least 1 weight %. In one exemplary embodiment, the nitrile containing monomers may be present in the first layer in an amount from about 5 to about 40 weight %, from about 8 to about 35 weight %, and preferably from about 10 to about 30 weight %.

The inner polymer layer may also include one or more multi-functional crosslinking monomers that have the ability to crosslink the monomers present within the first polymeric layer. Examples of suitable crosslinking monomer include, but are not limited to, divinyl benzene, ethylene glycol di(meth)acrylate, di(ethylene glycol)di(meth)acrylate, triethylene glycol di(meth)acrylate, propylene glycol di(meth)acrylate, 1,3-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, triallylformal tri(meth)acrylate, allyl methacrylate, trimethylol propane tri(meth)acrylate, tributanediol di(meth)acrylate, PEG 200 di(meth)acrylate, PEG 400 di(meth)acrylate, PEG 600 di(meth)acrylate, 3-acryloyloxyglycol monoacrylate, triacryl formal, triallyl isocyanate, and triallyl isocyanurate. In at least one exemplary embodiment, the crosslinking monomer is triallyl isocyanate. The crosslinking monomer(s) may be present in the first layer in an amount of at least 0.05 weight %. In one or more exemplary embodiments, the crosslinking monomers are present in an mount from about 0.07 to 5 weight %, from 0.1 to 4 weight %, and preferably, from 0.2 to 3 weight % based on the total weight of the monomers.

Additionally, the monomers forming the first layer (primary monomers), including the crosslinking monomers, may be present in amounts such that the weight average glass transition temperature (Tg) of the monomers (as if the monomers were in their mono-polymerized form) is less than 100° C., desirably less than 95° C., more desirably less than 90° C., and most desirably less than 85° C. The first polymer layer may also have any net charge, but desirably possesses a net negative charge. Also, the monomers of the first layer desirably have a weight average Tg that is less than the weight average Tg of the monomers of the outer layer. As an example only, if the first layer were to contain 3 wt % methyl methacrylate (Tg of PMMA is 105° C.), 17 wt % acrylonitrile (Tg of PAN is 95° C.) and 80 wt % of vinylidene chloride (Tg of PVC is 81° C.), then the weight average Tg of the monomers of the first polymeric layer according to this exemplified embodiment is 84.45° C.

In addition, it is possible that the monomers forming the first layer (primary monomers), including the crosslinking monomers, may be present in the outer layer, albeit at different concentrations and ratios of such monomers.

In one exemplary embodiment, the outer layer includes monomers (secondary monomers) that have a Tg of at least 85° C., preferably at least 90° C., and even more preferably, 95° C. In particular, the second layer may be formed of homopolymers and/or copolymers comprised of these high Tg monomers. As discussed in detail below, the addition of high Tg monomers near the end of the polymerization of the primary monomers creates an outer layer having a high concentration of the high Tg monomers, especially when compared to the first layer. This outer (second) layer containing the high Tg monomers both improves the thermal resistance and increases the strength of the microspheres. Non-limiting examples of suitable high Tg monomers include acrylonitrile (AN) monomers, vinylidene chloride (VDC), methyl methacrylate (MMA) monomers, tetraethylene glycol dimethacrylate monomers (TEGDMA), 2,3-epoxypropyl acrylate monomers (EPA) and methacrylonitrile monomers (MAN). In at least one exemplary embodiment, acrylonitrile is used as the high Tg monomer to create a second layer formed of (poly)acrylonitrile (PAN).

In another exemplary embodiment, the outer layer includes chemically active monomers may contain functional groups that remain chemically active after polymerization and present such functional groups on the outside surface of the shell. Accordingly, these chemically active monomers are able to generate surface onium ions and may also possess the ability to crosslink and improve the strength of the outer layer. In one or more embodiments, microspheres functionalized with GMA or VBC may be reacted with a nucleophile (e.g., 0.16 g of dimethyl sulfide or 0.62 g of trimethylamine) over a period of 24 hours at 60° C. to convert the surface functional groups to the cationic sulfonium and ammonium forms (as is disclosed, for example, for emulsion polymerization in U.S. Pat. Nos. 4,056,501; 4,002,586; and 3,936,890.

The incorporation of functional monomers in the outer layer may improve particle strength by crosslinking the surface of the microspheres. The functional groups on the monomers have covalently bonded thereto a cationic species. The cationic species is advantageously not desorbed when the microspheres are re-dispersed into large volumes of water, even when the microspheres are dispersed in the water for extended periods of time. The reactive monomers may include glycidyl methacrylate (GMA), methacrylic acid (MAA), vinyl benzyl chloride (VBC), and combinations thereof. In at least one exemplary embodiment, the cationic species is an organic (onium-type) cation, such as, for example, sulfonium and ammonium cations.

The combined net zeta potential of the first and second polymeric layers may be negative, neutral, or positive as measured by the net zeta potential determined at a pH of about 9.0 or less at an ionic strength from about $10^{-6}$ M to 0.1 M. In one embodiment, the net zeta potential of the polymeric shell may be from −100 to +500 mV. Preferably, the net zeta potential is from greater than or equal to zero to +500 mV. In exemplary embodiments, the net zeta potential is from greater than or equal to zero to +150 mV, most preferably from +10 to +130 mV at a pH of about 9.0 or less at an ionic strength of from $10^{-6}$M to 0.1 M as measured by standard and conventional methods of measuring zeta potential known to those of skill in the analytical and physical arts, preferably methods utilizing microelectrophoresis at room temperature. It is to be appreciated that the microsphere may also possess the above-described zeta potentials. U.S. Patent Publication No. 2007/0044929, which is incorporated by reference in its entirety, describes an additional embodiment to for modifying the charge of the microsphere via a covalent attachment.

The blowing agent within the microsphere is not particularly limited, and may be any blowing agent that, upon the application of heat energy, functions to provide internal pressure on the shell of the microsphere to force the microsphere to expand. The blowing agent may be liquid and/or gas. Non-limiting examples of suitable blowing agents for use in the microsphere include low boiling point hydrocarbons (e.g., propane, n-pentane, isopentane, neopentane, hexane, neohexane, butane, isoheptane, octane, and isooctane) and/or chlorinated hydrocarbons or fluorinated hydrocarbons (e.g., methyl chloride, methylene chloride, dichloroethane, dichloroethane, trichloroethane, and perfluorinated hydrocarbons). One or more blowing agent may be present within the microsphere. In exemplary embodiments, the blowing agent is isopentane or n-butane.

The expandable microspheres may contain any suitable amount of blowing agent. In at least one exemplary embodiment, the microspheres may contain at least 5% and not more than 50 wt % of the blowing agent based on the total weight of the blowing agent and the monomers contained within the polymer shell. In other exemplary embodiments, the blowing agent is present in the microsphere in an amount from about 10 to about 45 wt %, and preferably from about 20 to about 40 wt %.

The first and second layers of the microsphere may be the same, but are desirably not chemically and/or physically equivalent. Therefore, even when the first and second layers contain similar, if not identical monomers, the physical properties of the layers may be different due to differences in the ratios of monomers contained in each layer. Further, the existence of additive monomers, such as crosslinking monomers, may also create chemical and physical differences between the inner and outer layers of the expandable microsphere.

The properties of interest for the expandable microsphere include the temperature onset of expansion (To.e), the temperature onset of shrinkage (To.s), the maximum expansion volume, and the particle size. The temperature at which the expandable microsphere begins to expand is considered the temperature onset of expansion (To.e). It may also be known as Tstart. Desirably, a maximum expansion volume and narrow To.e, To.s, and particle size are achieved in the inventive microspheres. The To.e and the To.s may be determined by hot stage microscopy or with an optical microscope equipped with a heating stage. For example, a sample containing the microspheres may be heated at a rate of 10° C. per minute and the temperature onset of expansion and temperature onset of shrinkage visually noted. The microspheres may have a To.e. from about 60 to about 105° C., from about 65 to about 100° C., from about 70 to about 98° C., and preferably from about 75 to about 95° C. and a To.s that is greater than about 105° C., greater than about 110° C., greater than about 120° C., and preferably greater than about 130° C.

The maximum expansion volume of the particles at 110° C., denoted as $V_{110}$, may be determined by placing 0.2 g of dried particles in a 50 ml test tube. The test tube was then immersed in an oil bath maintained at 110° C. The maximum expanded volume was recorded by comparing the volume of the expanded particles in the test tube to a graduated (calibrated) test tube of the same size. The particle size distributions were measured using a Horiba LA-910 Laser Light Scattering Analyzer. The maximum expansion volume at 110° C. ($V_{110}$) of a the microspheres may be from 5 to 50 ml, from 7 to 40 ml, from 8 to 35 ml, and preferably from 10 to 30 ml.

The maximum expansion temperature, Tmax, can be determined by using therniomechanical analysis (TMA; Model 2940; TA Instruments). TMA may be measured to probe the expansion of particles under pressure load. 5 mg of unexpanded particles are deposited on an aluminum sample pan evenly and covered with a flat lid to prevent them from sticking to the expansion probe or sliding out the sides of the sample pan during expansion. The sample is placed under a pressure load of 1 N and heated from 60 to 150° C. at 5° C. per minute. The Tmax is the temperature at which the maximum expansion occurs. The expandable microspheres may have any Tmax, but desirably has a Tmax from about 90 to about 100° C., from about 95 to about 135° C., or from about 100 to about 120° C.

It is believed that the microspheres have an improved structural integrity by maintaining the blowing agent inside the shell and reducing shrinkage at low temperatures. As a result, an improved To.e and To.s profile is achieved that is more conducive to papermaking, which leads to more efficient bulking in paper at lower doses of microspheres in the paper.

The microspheres may have a volume average diameter in an expanded state from about 1 μm to about 100 μm, preferably from about 1 μm to about 50 μm, and more preferably from about 5 μm to about 40 μm, or from about 10 μm to about 20 μm. In exemplary embodiments, the microspheres have an expanded volume average diameter less than about 50 μm, less than about 30 μm, less than about 20 μm, or less than about 17 μm. The expanded volume average diameter as used herein refers to values obtained by measuring the microspheres according to ISO 13319:2000, "Determination of Particle Size Distributions—Electrical Sensing Zone and Method".

In addition, the microspheres may have a maximum expansion from about 1 to about 15 times, preferably from about 1.5 to 10 times, and more preferably from about 2 to 5 times the mean diameters. The microspheres may also have a maximum expansion volume from about 1 to about 100 times, preferably from about 5 to about 50 times, and even more preferably from about 10 to about 35 times the initial volume (i.e., unexpanded volume).

The expandable microspheres of the present invention may be made in any manner. One inventive method embodiment is discussed in detail below. In this embodiment, the microspheres are formed by suspension polymerization utilizing a "shot growth" technique. "Shot growth" may be defined herein as a process whereby polymerization of a first set of monomers (primary monomers) occurs until the first set of monomers is substantially consumed and a quantity or "shot" of a second monomer is added to drive the polymerization reaction to completion.

In one embodiment, the microspheres may have an expanded volume average diameter on the order of about 20 μm, and in one embodiment, less than 20 μm, are able to be produced. Although not wanting to be bound by any particular theory, it is hypothesized that the stabilizer system sufficiently stabilizes the polymer dispersion to permit adequate control of the polymerization and degree of polymerization and to prevent an agglomeration of the microspheres so as to achieve microspheres having diameters that are optimal for papermaking. Without sufficient stabilization, it has been determined that the microspheres tend to agglomerate or grow together, and control of the polymerization cannot be achieved.

As the primary monomers coalesce and form polymers, the inner layer of the microsphere takes form and thickens as the polymerization reaction progresses. After a period of time, the initial set of monomers, being provided at desired concentrations, are consumed in whole or in part and the energy from the polymerization reaction decreases. At this point in the process, an amount or "shot" of an additional monomer (secondary monomer) is added to the reaction system to drive the reaction to completion or nearly complete. A multitude of secondary monomers can be added to by this shot growth method to control the morphology and expandability of the microspheres. Also the monomer "shot" allows for a specific tailoring of the microsphere for desired purposes, such as, for example, papermaking.

Additionally, the shot growth method provides a way for the growth of the monomer to yield properties for strength and/or functionality. For instance, a high Tg monomer can be added as the secondary or "shot growth" monomer to position the high Tg monomer in the outer layer in a concentration that greatly exceeds the concentration of that particular Tg monomer in the inner layer. Alternatively, a chemically reactive monomer may be added as the shot-growth monomer to provide functional groups on the outer surface and permit the covalent attachment of cationic species. The combination of monomers forming the microsphere is chosen so as to achieve a desired performance level, optimal onset of temperature of shrinkage, optimal temperature onset of expansion, optimal maximum expansion temperature, and optimal distribution of particles for use in papermaking to increase the bulk of the paper.

The "shot growth" polymerization forms microspheres having an inner (i.e., first) polymeric layer and an outer (i.e., second) polymer layer. To form a microsphere according to the invention, at least one organic phase is contacted with at least one aqueous phase. The aqueous phase and the organic phase may be mixed to form a suspension and/or dispersion, and/or a system in which the organic phase droplets are formed in the aqueous phase.

The organic phase may contain any of the above-mentioned monomers in any amounts suitable to achieve expandable microspheres having the monomeric compositions in the above-described amounts and/or any one or more of the above-described properties and/or any one or more of the above-described characteristics. Although any of the above-described monomers for use in the first polymer layer may be used in accordance with the invention, reference will be made herein to a preferred embodiment in which vinylidene chloride (VDC), acrylonitrile (AN), and methyl methacrylate (MMA) are the primary monomers.

In one embodiment the primary monomers may be added to the reaction mixture such that the vinyl and/or vinylidene halide monomers are added at an amount not more than 60 wt % based upon the total weight of the reaction mixture, the nitrile containing monomers are added at an amount not more than 10 wt % based upon the total weight of the reaction mixture, the acrylic ester and/or methacrylic ester monomers are added at an amount not more than 2 wt % based upon the total weight of the reaction mixture.

In one embodiment, it has been discovered that microspheres with higher VDC levels demonstrate increased expanded volumes due to plasticization by residual monomer in addition to the polymer being more plastic.

The organic phase may also contain a polymerization initiator. The polymerization initiator is any chemical or compound that is capable of generating free radicals when the organic and aqueous phases are combined. The polymerization initiator may be added at any suitable amount to drive the polymerization of the polymer shell to completeness and deplete nearly all of the monomers present in the organic phase. Non-limiting examples of suitable polymerization initiators include 2,2'-azobisisobutyronitrile. Additionally, a crosslinking monomer (e.g., triallyl cyanurate (TAC) and a blowing agent (e.g., n-butane or isobutane) are included in the organic phase.

The aqueous phase also includes water, preferably deionized water, and a stabilizer or a stabilizer system which functions to stabilize the organic phase droplets. In one or more exemplary embodiments, the stabilizer system includes a stabilizer and a polyelectrolyte. Non-limiting examples of stabilizers for use in the aqueous phase include a silicon-containing compound, an aluminum-containing compound, colloidal silica, alumina, and colloidal alumina. The polyelectrolyte may be a cationic polyelectrolyte such as polyvinylamine (PVAm), such as, but not limited to, those commercially available from BASF under the trade name Lupamin® (e.g., Lupamin® 5095). Although not wishing to be bound by any particular theory, it is believed that the polyeletrolytes act as a promoter of the flocculation of the stabilizer, thereby driving the stabilizer to the organic phase/aqueous phase interface and/or droplet surface to more effectively stabilize the droplet. Accordingly, it is believed that the polyvinylamine forms aggregates with the silica particles to allow for better adsorption onto the monomer droplets. In at least one exemplary embodiment of the invention, the stabilizer system includes colloidal silica and polyvinylamine.

Additionally, a salt may be included in the aqueous phase to adjust the electrolyte concentration in the aqueous phase so that the hydrophobicity of the stabilizer is maintained at an elevated level. The salt is not particularly limited, and may be chosen from sodium chloride, calcium chloride, and/or aluminum chloride. In exemplary embodiments, sodium chloride (NaCl) is the salt utilized in the aqueous phase.

A phase partitioner such as ethanol may also be included in the aqueous phase to lower the interfacial tension between the oil and the aqueous phases and improve the phase separation of the blowing agent. In addition, sodium dichromate, or other suitable inhibitor, may be added as an inhibitor to inhibit, or even prevent, polymerization in the aqueous phase.

The aqueous phase may have any pH so long as the pH is at or near the isoelectric point of the stabilizer, which increases the stabilizer stabilizer's effectiveness to stabilize the organic droplet when the organic and aqueous phases are mixed. Desirably, the pH is an acidic pH. In exemplary embodiments, the pH is less than 5, and preferably less than 4. In at least one exemplary embodiment, the pH is 3.5. The pH of the aqueous phase may be pre-adjusted, i.e., prior to mixing with the organic phase. In addition, the pH may be adjusted with any suitable acid, such as hydrochloric acid.

The components of the organic and aqueous phase according to one exemplary embodiment are depicted in Table 1.

TABLE 1

| Organic Phase Components | Aqueous Phase Components |
| --- | --- |
| Monomers:<br>vinylidene chloride<br>acrylonitrile<br>methyl methacrylate | Deionized Water |
| Initiator<br>2,2'-azobisisobutyronitrile | Stabilizer System<br>colloidal silica<br>polyvinyl amine |
| Crosslinking Monomer<br>tallyl cyanurate | Sodium Chloride |

TABLE 1-continued

| Organic Phase Components | Aqueous Phase Components |
| --- | --- |
| Blowing Agent<br>n-butane<br>isobutane | Ethanol |
| | Sodium Dichromate<br>Hydrochloric Acid |

The organic phase and the aqueous phase are mixed, preferably at a temperature below the boiling points of the blowing agent(s). In one exemplary embodiment, the organic phase and the aqueous phase are homogenized in one vessel (e.g., a homogenizer or mixer) and then transferred and sealed in reactor vessel (e.g., pressure reaction bottle). The homogenization process forms the initial organic phase droplets. Thus, it is to be appreciated that variations in the homogenization process results in different droplet sizes in the suspensions and different particle sizes after polymerization.

In one embodiment, the reactor bottles are purged with an inert gas (e.g., argon) to remove oxygen from the headspace before adding the suspension. It was surprisingly discovered that oxygen, if is present in the reactor vessel, acts as an inhibitor, and polymerization of the monomers will not begin until the oxygen is consumed. In addition, the polymerization rate of the monomers can be significantly slower due to the lower initiator level (the oxygen consumes some of the initiator radicals). A lower polymerization rate results in a coagulation of the suspension as a result of the particles polymerizing too slowly and capturing each other during the course of the polymerization. Also, when oxygen is present, the final microspheres may undesirably be multi-cellular and the particle size distribution may be broader due to oxygen-induced aggregation.

After synthesis of the microspheres, the microspheres are filtered, washed, preferably with deionized water, and dried. The dried microspheres contain a residual web of silica that needs to be removed prior to expansion if, for example a lower vapor pressure blowing agent such as isobutane is utilized as the blowing agent. To remove the silica shell, the dried microspheres may be dispersed in deionized water and hydrogen peroxide. The resulting slurry may then be mixed and/or agitated (e.g., tumbled in the reaction vessel) to break the silica shell. Once the hydrogen peroxide treatment is complete, the microspheres are again washed to remove the silica particles, and dried.

In a separate embodiment, the organic and aqueous phases are mixed in a single reactor vessel (e.g. pressure reactor) under pressure (preferably purged with argon). The entire suspension is sheared in the same reactor vessel for a period of time until homogenization is complete. Thus, unlike the previously described embodiment, there is no transfer of the reaction mixture after homogenization. Additionally, in this exemplary embodiment, n-butane may be used as the blowing agent. The use of n-butane eliminates the need to remove residual silica from the microspheres by a hydrogen peroxide treatment. Because the n-butane has a high vapor pressure (one that is more than double the vapor pressure of isobutane), n-butane is able to expand the microspheres even when residual silica is still present on the surface of the microsphere. On the other hand, microspheres formed with lower vapor pressure blowing agents such as isobutane, a web of silica covering the microspheres must be broken with a hydrogen peroxide treatment and removed from the particle surface.

After the homogenized suspension is sealed in the reactor vessel, the suspension is heated, preferably with continuous mixing and at a lower shear rate, for a period of time until the polymerization reaction is nearly complete and/or the initiator is exhausted or depleted, yet additional monomers exist in the reaction mixture. In one exemplary embodiment, the polymerization reaction occurs until the polymerization of the primary monomers is approximately 90% complete. The period of time for the polymerization of the monomers varies in accordance with the desired properties of the polymeric shell and the reaction conditions and/or parameters. The period of time may be less than or equal to 24 hours, less than or equal to 17 hours, or less than 12 hours. In exemplary embodiments, the polymerization reaction time is not more than 6 hours or 8 hours.

After the polymerization of the monomers is nearly complete (e.g., approximately 90% complete) and/or the initiator has been depleted, a "shot" of additional monomer and/or initiator is added to the polymerization reactor to drive the reaction to completeness and also to form the second polymer layer. With this addition, the formation of the first polymer layer is complete and the formation of the second polymer layer begins. The addition of a secondary monomer (with or without initiator) permits the initiation of the second polymer layer because the secondary monomers tend to polymerize on the surface of the first polymer layer. Any of the above-mentioned monomers may be used as the secondary monomers, and the secondary monomer(s) may be the same or different from the monomers present in the first polymer layer. As a result, the second polymer layer may have similar chemical and physical characteristics as that of the first polymer layer. Desirably, the second layer has chemical and/or physical characteristics that are different from the first polymer layer.

Various monomers may be added by shot growth to control the morphology and expandability characteristics of the microsphere. Additionally, the "shot" of monomer(s) to the reaction vessel may also be used to increase the concentration of a particular monomer at the particle surface. According to one embodiment, at least one monomer having a high Tg (e.g., a Tg of at least 85° C.) is added to the reaction vessel as the "shot" of monomer. As discussed above, the Tg of the monomer is desirably at least 90° C., and even more desirably, 95° C. Any one of the high Tg monomers described above may be used to form the second layer.

As one example, 2,2'-azobisisobutyronitrile dissolved in acrylonitrile (AN) may be added to the reaction vessel as the initiator "shot" in the shot growth method. Because the monomer reacts primarily at the surface of the microsphere, relatively low amounts of monomer can be added and still create high levels of surface incorporation. The inclusion of additional acrylonitrile to the reaction vessel forms a second layer rich in poly(acrylonitrile) at the surface of the microspheres. It is believed that the double bonds present in the acrylonitrile monomers create a tight and robust microsphere that has improved strength characteristics. In addition to improving the strength of the microsphere, the addition of a high Tg monomer improves the thermal resistance of the microspheres, increased expansion volume, and higher onset temperature of shrinkage. Further, the high Tg monomer creates a second layer that is stronger in comparison to the first layer.

In another embodiment, the shot growth technique may be used to functionalize the particle surface. In this embodiment, monomers that remain chemically reactive after polymerization may be added to the reaction vessel. Non-limiting examples of such monomers include, but are not limited to, glycidyl methacrylate (GMA), methacrylic acid (MAA), vinyl benzyl chloride (VBC), and combinations thereof. As with the embodiment described above, the monomers react primarily at the surface of the microsphere (i.e., the surface of the first layer), causing the reactive functional groups of the monomer to be present on the outer surface of the second layer. It is to be appreciated that the microsphere, at this stage, has a negative charge.

Next, the functional groups on the surface of the second layer may be reacted with a cation, such as an organic (onium-type) cation, to form a positively charged microsphere surface that is relatively more cationic than conventional microspheres. Examples of onium-type cations include sulfonium and ammonium cations. The cation reacts with the functional group on the monomer to covalently bond the cation to the monomer. The resulting functionalized microspheres are relatively more cationic than conventional microspheres. As a result, such microspheres are able to be retained in the web of fibers more readily when being used in paper making, thereby enhancing the efficiency of such microspheres by enabling the papermaker to use less microspheres at a desired bulk.

The "shot" of monomer(s) may be added as early as 6 hours into the polymerization of the primary monomers. In exemplary embodiments, the shot growth, and subsequent polymerization of the secondary monomer(s), occurs at 8, 12 or 17 hours after the initiation of the polymerization of the primary monomers.

In one embodiment, the "shot" of monomer(s) may be added such that the amount of the high Tg monomer or the chemically reactive monomer ranges from about 0.2 wt % to 5 wt % based upon the total weight of the original reaction mixture. The amount of the shot" of monomer(s) may be added such that the amount of the high Tg monomer or the chemically reactive monomer is at least 0.3, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, and 5 wt % based upon the total weight of the reaction mixture, including any and all ranges and subranges therein.

In one embodiment, the "shot" of monomer(s) may also contain other reactants in the original reaction mixture. In one embodiment, the "shot" contains an initiator that may be identical to, or different from, the initiator used in the original reaction mixture. Within this shot, the initiator may be added such that the amount of the initiator ranges from about 25 wt % to 200 wt % based upon the total weight of the amount of initiator used in the original reaction mixture. The additional initiator may be added via the "shot" such that the amount of the initiator is 25, 30, 35, 40, 45, 50, 55, 60, 65, 70, 75, 80, 85, 90, 95, 100, 110, 120, 130, 140, 150, 175, and 200 wt % based upon the total weight of the amount of initiator used in the original reaction mixture, including any and all ranges and subranges therein.

While the microspheres of the present invention may be or have any use, an exemplary use is in conventional papermaking processes to make paper. The paper includes a web of cellulose fibers and the above-described microspheres. The term "paper" as used herein is meant to include all types of cellulose-based products in sheet or web form, including, but not limited to, paper, paperboard, paper substrates, and cardboard. As used herein, the terms "paper, "paper substrate", and "substrate" may be interchangeably used. The paper may be produced as a single layer or a multi-layer paper having two or more layers. Additionally, the paper may or may not be calendered. Paper according to the present invention may contain from 1 to 99 wt %, and desirably from 5 to 95 wt % of cellulose fibers based upon the total weight of the paper.

The amount of microspheres present in the paper depends upon the total weight of the substrate and/or the final paper or paperboard product. The paper substrate may contain greater than 0.001 wt %, more preferably greater than 0.02 wt %, most preferably greater than 0.1 wt % of the microspheres based on the total weight of the substrate. Further, the paper substrate may contain less than 20 wt %, preferably less than 10 wt %, and more preferably less than 5 wt % of the microspheres based on the total weight of the substrate.

The paper may contain recycled fibers and/or virgin fibers. Recycled fibers differ from virgin fibers in that the fibers have gone through the drying process at least once. In certain embodiments, at least a portion of the cellulose/pulp fibers may be provided from non-woody herbaceous plants including, but not limited to, kenaf, hemp, jute, flax, sisal, or abaca, although legal restrictions and other considerations may make the utilization of hemp and other fiber sources impractical and/or impossible. Either bleached or unbleached pulp fiber may be utilized. Desirably, the sources of the cellulose fibers are from softwood and/or hardwood.

Further, the softwood and/or hardwood fibers contained by the paper may be modified by physical and/or chemical means. Examples of physical means include, but are not limited to, electromagnetic and mechanical means. Non-limiting means for electrical modification include means involving contacting the fibers with an electromagnetic energy source such as light and/or electrical current. Suitable means for mechanical modification include means involving contacting an inanimate object with the fibers. Examples of such inanimate objects include those with sharp and/or dull edges. Such means also involve, for example, cutting, kneading, pounding, and/or impaling.

Examples of chemical means include conventional chemical fiber modification means such as crosslinking and precipitation of complexes thereon. Examples of such modification of fibers may be such as those found in the following: U.S. Pat. Nos. 6,592,717; 6,592,712; 6,582,557; 6,579,415; 6,579,414; 6,506,282; 6,471,824; 6,361,651; 6,146,494; H1,704; 5,731,080; 5,698,688; 5,698,074; 5,667,637; 5,662,773; 5,531,728; 5,443,899; 5,360,420; 5,266,250; 5,209,953; 5,160,789; 5,049,235; 4,986,882; 4,496,427; 4,431,481; 4,174,417; 4,166,894; 4,075,136; and 4,022,965, which are hereby incorporated by reference in their entireties. Further modification of fibers may be found in U.S. Patent Application Ser. No. 60/654,712 filed Feb. 19, 2005 (incorporated by reference in its entirety), which modification may include the addition of optical brighteners (i.e. OBAs) as discussed therein.

In a preferred embodiment, any of the above-mentioned fibers may be treated so as to have a high ISO brightness. Examples of fibers treated in this manner include, but are not limited to, those fibers described in U.S. patent application Ser. No. 11/358,543 filed Feb. 21, 2006 entitled "PULP AND PAPER HAVING INCREASED BRIGHTNESS", which is hereby incorporated by reference in its entirety; and PCT Patent Application Number PCT/US06/06011 filed Feb. 21, 2006 entitled "PULP AND PAPER HAVING INCREASED BRIGHTNESS", which is hereby incorporated by reference in its entirety.

While the pulp, fibers, and/or paper may have any brightness and/or CIE whiteness, preferably such brightness and/or CIE whiteness is as follows. The fiber and/or the pulp and/or paper substrate according to embodiments of the present invention may have any CIE whiteness, but preferably have a CIE whiteness greater than 70, more preferably greater than 100, even more preferably greater than 125, or even greater than 150. The CIE whiteness may be in the range from 125 to 200, preferably from 130 to 200, and most preferably from 150 to 200. Examples of measuring CIE whiteness and obtaining such whiteness in a fiber and paper made therefrom can be found, for example, in U.S. Pat. No. 6,893,473, which is hereby incorporated by reference in its entirety.

The fibers, the pulp and/or paper may have any ISO brightness, but preferably greater than 80, more preferably greater than 90, most preferably greater than 95 ISO brightness points. The ISO brightness may be preferably from 80 to 100, more preferably from 90 to 100, most preferably from 95 to 100 ISO brightness points. Examples of measuring ISO brightness and obtaining such brightness in a papermaking fiber and paper made therefrom can be found, for example, in U.S. Pat. No. 6,893,473, which is hereby expressly incorporated by reference in its entirety.

The paper substrate according to the present invention may be made off of the paper machine having any basis weight. The paper substrate may have either a high or low basis weight, including basis weights of at least 10 lbs/3000 square foot, preferably from at least 20 to 500 lbs/3000 square foot, and more preferably from at least 40 to 325 lbs/3000 square foot. Of course, one of skill will appreciate that these weights can easily be converted so as to be based upon 1300 square foot.

The paper substrate according to the present invention may have a Sheffield Smoothness of less than 400 Sheffield Units (SU). However, the preferred Sheffield Smoothness will be driven by the end product paper substrate's intended use. Preferably, the paper has a Sheffield Smoothness of less than 350 SU, preferably less than 250 SU, and more preferably less than 200 SU, as measured by TAPPI test method T 538 om-1.

The paper may include optional substances such as, but not limited to, retention aids, sizing agents, binders, fillers, thickeners, and preservatives. Examples of fillers include, but are not limited to, clay, calcium carbonate, calcium sulfate hemihydrate, and calcium sulfate dehydrate. A preferred filler is calcium carbonate with the preferred form being precipitated calcium carbonate. Non-limiting examples of binders include polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyacrylate, polyacrylate resin, acrylate, and methacrylate. Other optional substances include, but are not limited to, silicas such as colloids and/or sols. Suitable examples of silicas include, but are not limited to, sodium silicate and/or borosilicates. Other examples of optional substances are solvents such as water.

The paper substrate of the present invention may also contain retention aids selected from coagulation agents, flocculation agents, and entrapment agents dispersed within the bulk and porosity enhancing additives cellulosic fibers, such as the microspheres of the present invention. Retention aids for the bulk-enhancing additives retain a significant percentage of the additive in the middle of the paperboard and not in the periphery. Suitable retention aids function through coagulation, flocculation, or entrapment of the bulk additive. Coagulation comprises a precipitation of initially dispersed colloidal particles. This precipitation is suitably accomplished by charge neutralization or formation of high charge density patches on the particle surfaces. Since natural particles such as fines, fibers, clays, etc., are anionic, coagulation is advantageously accomplished by adding cationic materials to the overall system. Such selected cationic materials suitably have a high charge to mass ratio. Suitable coagulants include inorganic salts such as alum or aluminum chloride and their polymerization products (e.g. PAC or poly aluminum chloride or synthetic polymers); poly(diallyldimethyl ammonium chloride) (i.e., DADMAC); poly(dimethylamine)-co-epichlorohydrin; polyethylenimine; poly(3-butenyltrimethyl ammoniumchloride); poly(4-ethenylbenzyltrimethylammonium chloride); poly(2,3-epoxypropyltrimethylammonium chloride); poly(5-isoprenyltrimethylammonium chloride); and poly(acryloyloxyethyltrimethylammonium chloride). Other suitable cationic compounds having a high charge to mass ratio include all polysulfonium compounds, such as, for example, the polymer made from the adduct of 2-chloromethyl; 1,3-butadiene and a dialkylsulfide, all polyamines made by the reaction of amines such as, for example, ethylenediamine, diethylenetriamine, triethylenetetraamine or various dialkylamines, with bis-halo, bis-epoxy, or chlorohydrin compounds such as, for example, 1-2 dichloroethane, 1,5-diepoxyhexane, or epichlorohydrin, all polymers of guanidine such as, for example, the product of guanidine and formaldehyde with or without polyamines. The preferred coagulant is poly(diallyldimethyl ammonium chloride) (i.e., DADMAC) having a molecular weight of about ninety thousand to two hundred thousand and polyethylenimene having a molecular weight of about six hundred to 5 million. The molecular weights of all polymers and copolymers herein this application are based on a weight average molecular weight commonly used to measure molecular weights of polymeric systems.

Another advantageous retention system suitable for the manufacture of paperboard is flocculation, which is essentially the bridging or networking of particles through oppositely charged high molecular weight macromolecules. Alternatively, the bridging may be accomplished by employing dual polymer systems. Macromolecules useful for the single additive approach include cationic starches (both amylase and amylopectin), cationic polyacrylamide such as for example, poly(acrylamide)-co-diallyldimethyl ammonium chloride; poly(acrylamide)-co-acryloyloxyethyl trimethylammonium chloride, cationic gums, chitosan, and cationic polyacrylates. Natural macromolecules such as, for example, starches and gums, are rendered cationic usually by treating them with 2,3-epoxypropyltrimethylammonium chloride, but other compounds can be used such as, for example, 2-chloroethyl-dialkylamine, acryloyloxyethyldialkyl ammonium chloride, acrylamidoethyltrialkylammonium chloride, etc. Dual additives useful for the dual polymer approach are any of those compounds which function as coagulants plus a high molecular weight anionic macromolecule such as, for example, anionic starches, CMC (carboxymethylcellulose), anionic gums, anionic polyacrylamides (e.g., poly(acrylamide)-co-acrylic acid), or a finely dispersed colloidal particle (e.g., colloidal silica, colloidal alumina, bentonite clay, or polymer micro particles marketed by Cytec Industries as Polyflex). Natural macromolecules such as, for example, cellulose, starch and gums are typically rendered anionic by treating them with chloroacetic acid, but other methods such as phosphorylation can be employed. Suitable flocculation agents are nitrogen containing organic polymers having a molecular weight of about one hundred thousand to thirty million. The preferred polymers have a molecular weight of about ten to twenty million. The most preferred have a molecular weight of about twelve to eighteen million. Suitable high molecular weight polymers are polyacrylamides, anionic acrylamide-acrylate polymers, cationic acrylamide copolymers having a molecular weight of about five hundred thousand to thirty million and polyethylenimenes having molecular weights in the range of about five hundred thousand to two million.

The third method for retaining the bulk additive in the paper is entrapment. This is the mechanical entrapment of particles in the fiber network. Entrapment is suitably achieved by maximizing network formation such as by forming the networks in the presence of high molecular weight anionic polyacrylamides, or high molecular weight polyethyleneoxides (PEO). Alternatively, molecular nets are formed in the network by the reaction of dual additives such as, for example, PEO and a phenolic resin.

The optional substances may be dispersed throughout the cross section of the paper substrate or they may be more concentrated within the interior of the cross section of the paper substrate. Further, other optional substances such as binders and/or sizing agents (for example) may be concentrated more highly towards the outer surfaces of the cross section of the paper substrate. More specifically, a majority percentage of optional substances such as binders or sizing agents may preferably be located at a distance from the outside surface of the substrate that is equal to or less than 25%, more preferably 10%, of the total thickness of the substrate. Examples of localizing such optional substances such as binders/sizing agents as a function of the cross-section of the substrate is, for example, paper substrates having an "I-beam" structure and may be found in U.S. Provisional Patent Application Ser. No. 60/759,629 entitled "PAPER SUBSTRATES CONTAINING HIGH SURFACE SIZING AND LOW INTERNAL SIZING AND HAVING HIGH DIMENSIONAL STABILITY", which is hereby incorporated by reference in its entirety. Further examples that include the addition of bulking agents may be found in U.S. Provisional Patent Application Ser. No. 60/759,630 entitled "PAPER SUBSTRATES CONTAINING A BULKING AGENT, HIGH SURFACE SIZING, LOW INTERNAL SIZING AND HAVING HIGH DIMENSIONAL STABILITY", which is hereby incorporated by reference in its entirety; and U.S. patent application Ser. No. 10/662,699, now published as U.S. Patent Publication No. 2004/0065423 entitled "PAPER WITH IMPROVED STIFFNESS AND BULK AND METHOD FOR MAKING SAME", which is hereby incorporated by reference in its entirety.

The paper may also contain a surface sizing agent such as starch and/or modified and/or functional equivalents thereof at a wt % of from 0.05 wt % to 20 wt % and preferably from 5 to 15 wt % based on the total weight of the substrate. Examples of modified starches include, for example, oxidized, cationic, ethylated, hydroethoxylated, etc. Examples of functional equivalents are, but not limited to, polyvinyl alcohol, polyvinylamine, alginate, carboxymethyl cellulose, etc.

The paper may be made by contacting the expandable microspheres with cellulose fibers. Still further, the contacting may occur at acceptable concentration levels that provide the paper substrate of the present invention to contain any of the above-mentioned amounts of cellulose and expandable microspheres. More specifically, the paper substrate of the present application may be made by adding from 0.25 to 20 lbs of expandable microspheres per ton of cellulose fibers. Additionally, the contacting may occur anytime during the papermaking process including, but not limited to, the thick stock, thin stock, head box, and coater, with the preferred addition point being at the thin stock. Further addition points include machine chest, stuff box, and suction of the fan pump. In addition, the paper may be made by contacting further optional substances with the cellulose fibers as well. This contacting may also occur anytime in the papermaking process including, but not limited to the thick stock, thin stock, head box, size press, water box, and coater. Further addition points include machine chest, stuff box, and suction of the fan pump. The cellulose fibers, expandable microspheres, and/or optional components may be contacted serially, consecutively, and/or simultaneously in any combination with each other. The cellulose fibers and expandable microspheres may be pre-mixed in any combination before addition to or during the paper-making process.

The paper may be pressed in a press section containing one or more nips. However, any pressing means commonly known in the art of papermaking may be utilized. The nips may be, but are not limited to, single felted, double felted, roll, and extended nip in the presses. However, any nip commonly known in the art of papermaking may be utilized.

The paper may be dried in a drying section. Any drying means commonly known in the art of papermaking may be utilized. The drying section may include and contain a drying can, cylinder drying, Condebelt drying, IR, or other drying means and mechanisms known in the art. The paper substrate may be dried so as to contain any selected amount of water. Preferably, the substrate is dried to contain less than or equal to 10% water.

The paper substrate may be passed through a size press, where any sizing means commonly known in the art of papermaking is acceptable. The size press, for example, may be a puddle mode size press (e.g. inclined, vertical, horizontal) or metered size press (e.g. blade metered, rod metered). At the size press, sizing agents such as binders may be contacted with the substrate. Optionally these same sizing agents may be added at the wet end of the papermaking process as needed. After sizing, the paper substrate may or may not be dried again according to the above-mentioned exemplified means and other commonly known drying means in the art of papermaking. The paper substrate may be dried so as to contain any selected amount of water. Preferably, the substrate is dried to contain less than or equal to 10% water.

The paper substrate may be calendered by any commonly known calendaring means in the art of papermaking. More specifically, one could utilize, for example, wet stack calendering, dry stack calendering, steel nip calendaring, hot soft calendaring or extended nip calendering, etc. While not wishing to be bound by theory, it is thought that the presence of the expandable microspheres may reduce and alleviate requirements for harsh calendaring means and environments for certain paper substrates, dependent on the intended use thereof. During calendaring, the substrate may be subjected to any nip pressure. However, preferably nip pressures may be from 5 to 50 psi, more preferably from 5 to 30 psi.

The paper substrate may be microfinished according to any microfinishing means commonly known in the art of papermaking. Microfinishing is a means involving frictional processes to finish surfaces of the paper substrate. The paper substrate may be microfinished with or without a calendering means applied thereto consecutively and/or simultaneously. Examples of microfinishing means can be found in United States Published Patent Application 2004/0123966 and references cited therein, which are all hereby, in their entireties, herein expressly incorporated by reference.

In one embodiment of the present invention, the paper substrate of the present invention may be a coated paper substrate. Accordingly, in this embodiment, the paper substrate of the present invention may also contain at least one coating layer, including optionally two coating layers and/or a plurality thereof. The coating layer may be applied to at least one surface of the paper board and/or substrate, including two surfaces. Further, the coating layer may penetrate the paper board and/or substrate. The coating layer may contain a binder. Further the coating layer may also optionally contain a pigment. Other optional ingredients of the coating layer are surfactants, dispersion aids, and other conventional additives for printing compositions.

The coating layer may include a plurality of layers or a single layer having any conventional thickness as needed and produced by standard methods, especially printing methods. For example, the coating layer may contain a basecoat layer and a topcoat layer. The basecoat layer may, for example, contain low density thermoplastic particles and optionally a first binder. The topcoat layer may, for example, contain at least one pigment and optionally a second binder which may or may not be a different binder than the first. The particles of the basecoat layer and the at least one pigment of the topcoat layer may be dispersed in their respective binders.

While the coated or uncoated paper substrate may have any Sheffield Smoothness, in one or more exemplary embodiment, the coated paper substrate according to the present invention may have a Sheffield Smoothness that is less than 50, preferably less than 30, more preferably less than 20, and most preferably less than 15 as measured by TAPPI test method T 538 om-1.

While the coated or uncoated paper substrate may have any Parker Print Smoothness (10 $kgf/c^{m2}$), in one embodiment, the coated paper substrate according to the present invention may have a Parker Print Smoothness (10 $kgf/c^{m2}$) less than or equal to 2, preferably less than 1.5, more preferably less than 1.3, and most preferably from about 1.0 to 0.5 as measured by TAPPI test method T 555 om-99.

The coated paper substrate according to the present invention may have an improved print mottle as measured by $2^{nd}$ Cyan scanner mottle. Scanner mottle is determined using the following procedure: Representative samples are selected from pigment coated paper or paperboard printed under controlled conditions typical of commercial offset litho production with the cyan process ink at a reflection density of 1.35±0.05. A 100 percent solid cyan print reflective image is digitally scanned and transformed through a neural network model to produce a print mottle index number between zero (perfectly uniform ink lay with no mottle) to ten (visually noticeable, objectionable and likely rejectable because of print mottle, a random non-uniformity in the visual reflective density or color of the printed area). Data from this $2^{nd}$ Cyan scanner mottle system can be correlated to subjective visual perception (using the zero-to-ten guideline) or can be transformed into equivalent mottle values as measured with a Tobias mottle tester from Tobias Associates using the following equation:

Tobias=Scanner Mottle*8.8+188

The methods of describing the procedures and details of setting up of the above-mentioned equation can be found in U.S. patent application Ser. No. 10/945,306 filed Sep. 20, 2004, which is hereby incorporated by reference in its entirety.

In a preferred embodiment, the coated or uncoated paper of paperboard substrate of the present invention has any $2^{nd}$ Cyan scanner print mottle. However, the $2^{nd}$ Cyan scanner print mottle may be from 0 to 10, preferably not more than 6, more preferably not more than 5, and most preferably not more than 4.

The coated paper or paperboard of this invention can be prepared using known conventional techniques. Methods and apparatuses for forming and applying a coating formulation to a paper substrate are well known in the paper and paperboard art. See for example, G. A. Smook and references cited therein, all of which are hereby incorporated by reference in their entireties. All such known methods can be used in the practice of this invention and will not be described in detail. For example, the mixture of essential pigments, polymeric or copolymeric binders and optional components can be dissolved or dispersed in an appropriate liquid medium, preferably water.

The coating formulation can be applied to the substrate by any suitable technique, such as cast coating, Blade coating, air knife coating, rod coating, roll coating, gravure coating, slot-die coating, spray coating, dip coating, Meyer rod coating, reverse roll coating, extrusion coating or the like. In addition, the coating compositions can also be applied at the size press of a paper machine using rod metering or other metering techniques. In the preferred embodiments of the invention, the basecoat coating formulation is applied using blade coaters and the topcoat coating formulation is applied using a blade coater or air knife coater. In the most preferred embodiments the basecoat is applied using a stiff blade coater and the topcoat is applied using a bent blade coater or an air knife coater.

The coated or uncoated paper is dried after treatment with the coating composition. Methods and apparatuses for drying paper or paperboard webs treated with a coating composition are well known in the paper and paperboard art. See for example G. A. Smook referenced above and references cited therein. Any conventional drying method and apparatus can be used, and would be identifiable by one of skill in the art. Accordingly, these methods and apparatuses will not be described herein in any great detail. Preferably after drying, the paper web will have a moisture content equal to or less than about 10% by weight. The amount of moisture in the dried paper or paperboard web is preferably from about 5 to about 10% by weight.

After drying, the coated or uncoated paper may be subjected to one or more post drying steps, such as those described in G. A. Smook referenced above (and references cited therein). For example, the paper web may be calendered to improve the smoothness and improve print mottle performance, as well as other properties of the paper such as, for example, by passing the coated paper through a nip formed by a calender. Gloss calenders (chromed steel against a rubber roll) or hot soft gloss calenders (chromed steel against a composite polymeric surface) may be used to impart gloss to the top coated paper or paperboard surface. The amount of heat and pressure needed in these calenders depends on the speed of the web entering the nip, the roll sizes, roll composition and hardness, specific load, the topcoat and basecoat weights, the roughness of the under lying rough paperboard, the binder strength of the coatings, and the roughness of the pigments present in the coating.

The substrate and coating layer are contacted with each other by any conventional coating layer application means, including impregnation means. A preferred method of applying the coating layer is with an in-line coating process with one or more stations. The coating stations may be any of known coating means commonly known in the art of papermaking including, for example, brush, rod, air knife, spray, curtain, blade, transfer roll, reverse roll, and/or cast coating means, as well as any combination of the same.

The coated substrate may be dried in a drying section. Any drying means commonly known in the art of papermaking and/or coatings may be utilized. The drying section may include and contain IR, air impingement dryers and/or steam heated drying cans, or other drying means and mechanisms known in the coating art. In addition, the coated substrate may be finished according to any finishing means commonly known in the art of papermaking. Examples of such finishing means, including one or more finishing stations, include gloss calendar, soft nip calendar, and/or extended nip calendar.

These above-mentioned methods of making the paper of the present invention may be added to any conventional papermaking processes, as well as converting processes, including abrading, sanding, slitting, scoring, perforating, sparking, calendaring, sheet finishing, converting, coating, laminating, printing, etc. Preferred conventional processes include those tailored to produce paper substrates capable as being utilized as coated and/or uncoated paper products, board, and/or substrates.

The expandable microsphere of the present invention may be utilized in any and all end uses commonly known in the art for using paper and/or paperboard substrates. Such end uses include the production of paper and/or paperboard packaging and/or articles, including those requiring high and low basis weights in the respective substrates, which can range from envelopes and forms to folding carton, respectively. Further, the end product may have multiple paper substrate layers, such as corrugated structures, where at least one layer contains the expandable microsphere of the present invention.

Having generally described this invention, a further understanding can be obtained by reference to certain specific examples illustrated below which are provided for purposes of illustration only and are not intended to be all inclusive or limiting unless otherwise specified.

EXAMPLES

Example 1

Preparation of Microspheres Using Suspension Polymerization with a Shot Growth Method 1. Preparation of the Aqueous Phase 100 g of deionized water was added to 7.4 g of sodium chloride in a 250 ml beaker. The solution was stirred until the sodium chloride was dissolved. 6.25 g of sodium dichromate (2.5% aqueous solution) was added to the sodium chloride solution with stirring. Stirring was continued for 2 minutes. 5.5 g of ethanol was then added to this solution and stirred for two minutes. Next, 5.25 g of Lupamin® 5095, a polyvinyl amine commercially available from BASF, was added to a 1000 ml beaker. 137.5 g of deionized water was added to the polyvinyl amine and the solution was stirred for about 2 minutes. 40.4 g of colloidal silica was placed into a separate 250 ml beaker, 130 g of deionized water was added thereto, and the resulting solution was stirred for about 2 minutes. The colloidal silica solution was then slowly added to the 1000 ml beaker containing the polyvinyl amine solution and stirring was continued for 5 minutes. After 5 minutes, the sodium chloride/sodium dichromate/ethanol solution was added to the 1000 ml beaker with stirring. Stirring was continued for an additional 5 minutes. Concentrated hydrochloric acid was added to bring the pH of the aqueous phase to 3.5, and the solution was stirred for an additional 5 minutes.

2. Preparation of the Organic Phase 195.18 g of vinylidene chloride (VDC) was added to a flask that was chilled to −30° C. 113.9 g of isobutane was added to the chilled flask. The resulting mixture was poured into a large pressure addition burette that had been purged with argon and chilled in a freezer. The funnel used to pour the mixture into the burette was chilled with liquid nitrogen to minimize evaporation of the isobutane. Next, 35.58 g of acrylonitrile (AN), 2.6 g of 2,2'-azobisisobutyronitrile (AIBN), 1.78 g of trallyl cyanurate (TAC), 7.12 g of methyl methacryhlate (MMA) was added to a flask at room temperature. The flask was shaken to dissolve the AIBN and the TAC. The mixture was then poured into a small pressure addition burette that had been purged with argon. The mixture in the small pressure addition burette was transferred to the big pressure burette by pressurized argon. The organic phase present in the big burette was mixed by turning the burette up and down 10 times.

3. Disperse the Organic Phase into the Aqueous Phase

The aqueous phase formed in step 1 above was added to a 3-liter reactor that had been purged with argon. The aqueous phase was stirred within the reactor at a 1,500 rpm shear rate while the organic phase was slowly added by pressurized argon (over a period of 10 minutes). After the addition of the organic phase was completed, the mixture was agitated for 15 minutes. A stable dispersion was formed. The shear rate was then reduced to 90 rpm.

4. Polymerization Reaction

The polymerization reaction was initiated by heating the mixture in the reactor to 60° C. The reaction temperature was permitted to remain at 60° C. for 12 hours. The pressure inside the reactor during the polymerization was maintained from bout 5 to about 8.5 bars. After 12 hours of polymerization, a solution containing 1.25 g of AIBN dissolved in 8.5 g of AN was added to the reactor by using a small (250 ml) pressure addition burette and pressurized argon. The temperature of the mixture was increased to 70° C. The mixture was them permitted to react for 8 hours. The pressure inside the reactor during this 8 hour period was about 8.5 to about 10.5 bars.

5. Post Polymerization Treatment

After the 8 hour polymerization period, the reactor was cooled to room temperature and the pressure was released. The mixture within the reactor was transferred to a 2,000 ml beaker. The mixture was then filtered using a 150 μm meter mesh screen to remove any coarse coagulum. Next, the microspheres were filtered using a regular vacuum filtration assembly with a funnel, grade 4 qualitative paper, and a filtration flask connected to a hose vacuum. The microspheres were washed three times with deionized water. The ease in the filtration flask was poured out and the microspheres in the funnel were permitted to dry overnight. The dried microspheres were then weighed and the yield was calculated (about 86% based on the weight of the microspheres and the organic phase).

Similar processes were used for the other samples as set forth in Table 1. The same amount of AIBN and AN for the "shot growth" was used for all the samples in Table 1. The same reaction time both before and after the shot of AN was used for all the samples set forth in Table 2 with the exception of Sample 10, which had 8 hours of polymerization before the shot of AN and 8 hours of polymerization after the shot and Sample 13, which had 6 hours of polymerization before the shot of AN and 7 hours of polymerization after the shot.

TABLE 2

| | Organic Phase Components | | | | | | |
|---|---|---|---|---|---|---|---|
| Sample | VDC (% by weight) | AN (% by weight) | TAC (% by weight) | i-butane (% by weight) | AIBN (% by weight) | MMA (% by weight) | Agitator Speed (RPM) |
| 1 | 54.8 | 10 | 0.5 | 32 | 0.73 | 2.0 | 1500 |
| 2 | 53.8 | 10 | 1.5 | 32 | 0.73 | 2.0 | 1500 |
| 3 | 47.8 | 16 | 1.5 | 32 | 0.73 | 2.0 | 1500 |
| 4 | 51.3 | 13 | 1.0 | 32 | 0.73 | 2.0 | 1500 |
| 5 | 48.8 | 16 | 0.5 | 32 | 0.73 | 2.0 | 1500 |
| 6 | 55.1 | 10 | 0.2 | 32 | 0.73 | 2.0 | 1500 |
| 7 | 57.42 | 7.5 | 0.35 | 32 | 0.73 | 2.0 | 1500 |
| 8 | 59.8 | 5 | 0.5 | 32 | 0.73 | 2.0 | 1500 |

TABLE 2-continued

Organic Phase Components

| Sample | VDC (% by weight) | AN (% by weight) | TAC (% by weight) | i-butane (% by weight) | AIBN (% by weight) | MMA (% by weight) | Agitator Speed (RPM) |
|---|---|---|---|---|---|---|---|
| 9 | 54.8 | 10 | 0.5 | 32 | 0.73 | 2.0 | 1500 |
| 10 | 54.8 | 10 | 0.5 | 32 | 0.73 | 2.0 | 1500 |
| 11 | 47.8 | 16 | 1.5 | 32 | 0.73 | 2.0 | 1200 |
| 12 | 48.8 | 16 | 0.5 | 32 | 0.73 | 2.0 | 1200 |
| 13 | 54.8 | 10 | 0.5 | 32 | 0.73 | 2.0 | 1500 |
| 14 | 51.3 | 13 | 1.0 | 32 | 0.73 | 2.0 | 1200 |

TABLE 3

Aqueous Phase Components

| Deionized Water | Sodium Chloride (% by weight) | Polyvinyl Amine (% by weight) | Colloidal Silica (% by weight) | Sodium Dichromate (% by weight) | Ethanol (% by weight) | Hydrochloric Acid (pH 3.5) |
|---|---|---|---|---|---|---|
| 85.0 | 1.7 | 1.2 | 9.3 | 1.4 | 1.3 | — |

The particle size distributions of these microspheres were characterized by the Malvern Mastersizer particle size analyzer. Table 4 sets forth the results of these particle size analyses.

TABLE 4

Particle Size of Microspheres

| Sample | D (v, 0.1) | D (v, 0.5) | D (v, 0.9) |
|---|---|---|---|
| 1 | 5.02 | 20.49 | 36.07 |
| 2 | 9.91 | 20.22 | 38.5 |
| 3 | 7.51 | 18.08 | 37.69 |
| 4 | 6.13 | 20.84 | 40.96 |
| 5 | 6.37 | 19.61 | 44.52 |
| 6 | 12.78 | 23.96 | 39.63 |
| 7 | 7.81 | 21.71 | 41.04 |
| 8 | 7.13 | 20.76 | 38.99 |
| 9 | 5.08 | 17.95 | 33.73 |
| 10 | 4.72 | 19.09 | 24.21 |
| 11 | 9.73 | 27.14 | 53.78 |
| 12 | 7.45 | 24.17 | 42.66 |
| 13 | 9.50 | 20.64 | 34.54 |
| 14 | 7.2 | 21.59 | 44.37 |

Example 2

Microspheres in Papermaking Process

Paper samples containing the expandable microspheres described above in Example 1 were produced. Dry samples of the microspheres from Example 1 were formed into a 2% slurry by adding the dry microspheres to vigorously stirring water with a cowls mixer. After 10 minutes of mixing, the slurry was ready for a paper making machine.

The paper machine was started and uncoated freesheet paper grade with a targeted basis weight of 80 g/m² was produced. The pulp blend was 65/35 bleached hardwood kraft pulp/bleached softwood kraft pulp. The paper contained 10% precipitated calcium carbonate filler and 15 lb/T cationic starch. An ethylated starch was used at the size press with a targeted pick-up of 80 lb/T.

Microspheres from Example 1 were fed into the paper machine at a target dose of 15 lb/T. The addition point was before the 15 lb/T of cationic starch. 20 minutes after adding the first microsphere sample, the paper machine had come to equilibrium and samples of paper at the reel were collected. All 14 samples of microspheres described in Example 1 were run on the paper machine in a similar manner. The paper samples were then calendered on a sheet fed off-machine calender to achieve the desired smoothness. The basis weight, smoothness, and stiffness were measured on the calendered paper. In this manner, bulk and stiffness were compared between the different microsphere-containing papers. The increase in bulk compared to the paper made without any microspheres was calculated and recorded. The results are set forth in Tables 5 and 6.

TABLE 5

Uncalendered Paper Results

| | | Uncalendered | |
|---|---|---|---|
| Sample | Basis Weight (g/m²) | Bulk | % Bulk Increase |
| Control | 81.4 | 2.13 | 0.0 |
| 1 | 83.1 | 2.33 | 9.1 |
| 2 | 82.5 | 2.31 | 8.1 |
| 3 | 82.0 | 2.25 | 5.6 |
| 4 | 80.7 | 2.40 | 12.5 |
| 5 | 80.7 | 2.51 | 17.8 |
| 6 | 80.2 | 2.32 | 8.6 |
| 7 | 80.8 | 2.21 | 3.6 |
| 8 | 80.8 | 2.20 | 2.9 |
| 9 | 82.4 | 2.44 | 14.5 |
| 10 | 82.6 | 2.47 | 15.6 |
| 11 | 84.5 | 2.29 | 7.2 |
| 12 | 80.7 | 2.45 | 16.4 |
| 13 | 79.2 | 2.50 | 17.2 |
| 14 | 79.2 | 2.36 | 10.6 |

TABLE 6

Calendered Paper Results

| | | Calendered to 250 Sheffield | | | |
|---|---|---|---|---|---|
| Sample | Basis Weight (g/m²) | Bulk | % Bulk Increase | GM Stiffness Index | Caliper |
| Control | 81.4 | 1.69 | 0.0 | 133.1 | 5.4 |
| 1 | 83.1 | 1.78 | 5.7 | 131.0 | 5.9 |
| 2 | 82.5 | 1.81 | 7.2 | 130.2 | 5.9 |
| 3 | 82.0 | 1.84 | 9.1 | 142.2 | 5.9 |
| 4 | 80.7 | 1.86 | 10.0 | 134.7 | 5.8 |
| 5 | 80.7 | 1.91 | 13.4 | 138.9 | 6.1 |
| 6 | 80.2 | 1.86 | 10.1 | 140.8 | 6.0 |
| 7 | 80.8 | 1.86 | 10.2 | 147.7 | 5.8 |
| 8 | 80.8 | 1.82 | 7.6 | 144.8 | 5.8 |
| 9 | 82.4 | 1.89 | 12.1 | 134.9 | 6.1 |
| 10 | 82.6 | 1.87 | 10.8 | 133.1 | 6.2 |
| 11 | 84.5 | 1.81 | 7.1 | 129.1 | 6.0 |
| 12 | 80.7 | 1.88 | 11.4 | 137.2 | 6.0 |
| 13 | 79.2 | 1.91 | 13.5 | 135.8 | 6.0 |
| 14 | 79.2 | 1.87 | 11.0 | 136.3 | 5.8 |

The results from Example 2 showed that all of the microspheres produced in Example 1 demonstrated in increase in uncalendered and calendered bulk at 250 Sheffield smoothness.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of forming an expandable microsphere comprising: mixing primary monomers selected from nitrile containing monomers, acrylic ester monomers, methacrylic ester monomers, vinyl esters, vinyl halide monomers and combinations thereof, at least one blowing agent, a crosslinking monomer, a polymerization initiator, and a stabilizer system in a reaction vessel for a period of time sufficient to achieve an approximate 90% polymerization of said primary monomers and form a first polymeric layer surrounding said blowing agent; and adding a secondary monomer selected from monomers having a Tg of at least 85° C. and chemically reactive monomers to said reaction vessel to form a second polymeric layer at least substantially surrounding said first polymeric layer and forming an expandable microsphere.

2. The method of claim 1, wherein said reaction vessel further includes at least one member selected from a salt, a phase partitioner, an inhibitor an acid and water.

3. The method of claim 1, further comprising: purging said reaction vessel to remove oxygen.

4. The method of claim 1, further comprising: adding a cationic species to said microsphere such that said cationic species covalently bonds to said second polymeric layer.

5. The method of claim 1, wherein the secondary monomer is selected from monomers having a Tg of at least 85° C. which are: acrylonitrile (AN) monomers; vinylidene chloride (VDC); methyl methacrylate (MMA) monomers; tetraethylene glycol dimethacrylate monomers (TEGDMA); 2,3-epoxypropyl acrylate monomers (EPA); or methacrylonitrile monomers (MAN).

6. The method of claim 1, wherein the secondary monomer is selected from chemically reactive monomers which are: glycidyl methacrylate (GMA); methacrylic acid (MAA); vinyl benzyl chloride (VBC); or combinations thereof.

* * * * *